US011927157B1

(12) United States Patent
Keblusek et al.

(10) Patent No.: US 11,927,157 B1
(45) Date of Patent: Mar. 12, 2024

(54) HEAT EXCHANGER CLEANING SYSTEM AND METHOD

(71) Applicant: International Engine Intellectual Property Company, LLC, Lisle, IL (US)

(72) Inventors: Michael Charles Keblusek, Lombard, IL (US); Kyle O'Hara, Hoffman Estates, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 18/106,077

(22) Filed: Feb. 6, 2023

(51) Int. Cl.
*F02M 26/45* (2016.01)
*F02M 26/48* (2016.01)
*F02M 31/20* (2006.01)
*F02M 26/00* (2016.01)

(52) U.S. Cl.
CPC ............ *F02M 26/45* (2016.02); *F02M 26/48* (2016.02); *F02M 31/20* (2013.01); *F02M 2026/001* (2016.02)

(58) Field of Classification Search
CPC ........ F02M 26/45; F02M 26/48; F02M 31/20; F02M 2026/001
See application file for complete search history.

(56) References Cited

U.S. PATENT DOCUMENTS

| | | |
|---|---|---|
| 6,006,733 A | 12/1999 | Oleksiewicz |
| 6,698,409 B1 | 3/2004 | Kennedy et al. |
| 6,931,837 B2 | 8/2005 | Verkiel et al. |
| 6,934,619 B2 | 8/2005 | Read et al. |
| 6,947,822 B2 | 9/2005 | Martinez, Jr. et al. |
| 6,955,162 B2 | 10/2005 | Larson et al. |
| 6,973,382 B2 | 12/2005 | Rodriguez et al. |
| 6,985,808 B1 | 1/2006 | Kennedy |
| 7,047,953 B2 | 5/2006 | Kennedy |
| 7,124,582 B2 | 10/2006 | Kennedy |
| 7,461,627 B2 | 12/2008 | Liu et al. |
| 8,010,276 B2 | 8/2011 | Oehlerking |
| 8,205,606 B2 | 6/2012 | Rodriguez et al. |
| 8,267,069 B2 | 9/2012 | Hsia et al. |
| 2008/0098999 A1 | 5/2008 | Melhem et al. |
| 2011/0036335 A1 | 2/2011 | Wood et al. |
| 2011/0041816 A1 | 2/2011 | Hsia et al. |
| 2011/0048389 A1 | 3/2011 | Hsia et al. |

(Continued)

*Primary Examiner* — Grant Moubry
(74) *Attorney, Agent, or Firm* — Umang Khanna

(57) ABSTRACT

A heat exchanger cleaning system (HECS) includes an engine having an intake conduit and an exhaust port, and an EGR cooler having a cooler inlet in fluid communication with the engine exhaust port, a cooler outlet in fluid communication with the engine intake conduit, and an exhaust gas recirculation (EGR) valve disposed between the engine exhaust port and the EGR cooler. A first pressure sensor is disposed between the engine exhaust port and the EGR valve, and a second pressure sensor disposed in the engine intake conduit. A controller is in electrical communication with the EGR valve, the first pressure sensor, and the second pressure sensor. The controller is configured to implement a predetermined set of operating parameters for the engine and/or the EGR valve, wherein implementation of the predetermined set of operating parameters causes an increased flow velocity of exhaust gas through the EGR cooler.

16 Claims, 3 Drawing Sheets

(56) References Cited

U.S. PATENT DOCUMENTS

| | | | | |
|---|---|---|---|---|
| 2011/0083648 | A1 | 4/2011 | Cattani et al. | |
| 2011/0100343 | A1 | 5/2011 | Liu et al. | |
| 2012/0323470 | A1* | 12/2012 | Klingbeil | F02M 26/50 701/108 |
| 2020/0284217 | A1* | 9/2020 | Hakeem | F02D 13/0257 |

* cited by examiner

HEAT EXCHANGER CLEANING SYSTEM AND METHOD

FIELD OF THE INVENTION

The present disclosure relates generally to a system and method for cleaning the flow paths of a heat exchanger, and more particularly to a system and method for cleaning out the flow paths of an exhaust gas recirculation (EGR) cooler, wherein the method includes increasing the velocity of gas passing through the EGR cooler to shear hydrocarbons and soot off of the EGR cooler flow path surfaces.

BACKGROUND $NO_x$ and $O_3$ emissions are produced by excessively high temperatures that are present during combustion within diesel engines. Exhaust gas recirculation (EGR) systems reduce the production of $NO_x$ and $O_3$ emissions at least in part by lowering the combustion temperature of the diesel fuel. This is accomplished at least in part by recirculating a portion of the exhaust gas from the engine back into the engine. The recirculated exhaust gas effectively dilutes the diesel/air mixture, which lowers the combustion temperature.

Heat exchangers include multiple internal flow paths for the passage of fluids, wherein the flow paths are arranged so that the fluids passing therethrough are in mutual thermal contact thereby allowing heat transfer between the fluids. Build-up of extraneous matter on any of the internal flow paths within a heat exchanger can reduce the rate of heat transfer. Build-up that is severe enough to form even a partial blockage within a flow path can further reduce the heat transfer rate or even render the heat exchanger effectively inoperable. In the case of a diesel engine, passing the recirculated exhaust gas through a heat exchanger, for example an exhaust gas recirculation (EGR) cooler, provides further lowering of the combustion temperature to further reduce the production of $NO_x$ and $O_3$ emissions. Unfortunately, gas flow paths through such an EGR cooler are prone to a build-up of hydrocarbons and soot from the exhaust gas, to the point of causing a flow restriction through the EGR cooler that renders the EGR cooler effectively inoperable. A method for cleaning out build-up within a heat exchanger, for example hydrocarbon and soot buildup within an EGR cooler, is thus needed.

SUMMARY OF THE INVENTION

In one aspect of the invention, a heat exchanger cooling system comprises an engine, an engine intake conduit, an engine exhaust port, and an exhaust gas recirculation (EGR) cooler having a cooler inlet in fluid communication with the engine exhaust port, a cooler outlet in fluid communication with the engine intake conduit, and an EGR valve disposed in fluid communication with and between the engine exhaust port and the EGR cooler. A first pressure sensor is disposed in fluid communication with and between the engine exhaust port and the EGR valve, and a second pressure sensor is disposed in the engine intake conduit. A controller is in electrical communication with the EGR valve, the first pressure sensor, and the second pressure sensor, wherein the controller is configured to implement a predetermined set of operating parameters for the engine and/or the EGR valve, wherein implementation of the predetermined set of operating parameters causes an increased flow velocity of exhaust gas through the EGR cooler.

In another aspect of the invention, a heat exchanger cooling system comprises an engine, an engine intake conduit having an intake throttle valve disposed therein, an engine exhaust port, and an exhaust manifold having a single inlet conduit and two outlet paths, wherein the single inlet conduit connects to the engine exhaust port, wherein a first path of the two outlet paths includes a thermal management valve disposed therein, and wherein a second path of the two outlet paths includes an exhaust gas recirculation (EGR) valve disposed therein. An EGR cooler includes a cooler inlet in fluid communication with the EGR valve and a cooler outlet in fluid communication with the intake throttle valve. A first pressure sensor is disposed in the first path upstream of the thermal management valve, a second pressure sensor is disposed in the second path upstream of the EGR valve, and a third pressure sensor is disposed in the engine intake conduit upstream of the intake throttle valve. A controller is in electrical communication with the EGR valve, the thermal management valve, the intake throttle valve, the first pressure sensor, the second pressure sensor, and the third pressure sensor, wherein the controller is configured to implement a predetermined set of operating parameters for the engine, the EGR valve, the thermal management valve, and/or the intake throttle valve, wherein implementation of the predetermined set of operating parameters causes an increased flow velocity of exhaust gas through the EGR cooler.

In a further aspect of the invention, a heat exchanger cooling system comprises an engine, an engine intake conduit having an intake throttle valve disposed therein, an engine exhaust port, and an exhaust manifold having a single inlet conduit and two outlet paths, wherein the single inlet conduit connects to the engine exhaust port, wherein a first path of the two outlet paths includes a thermal management valve disposed therein, and wherein a second path of the two outlet paths includes an exhaust gas recirculation (EGR) valve disposed therein. An EGR cooler includes a cooler inlet in fluid communication with the EGR valve and a cooler outlet in fluid communication with the intake throttle valve. A variable geometry turbocharger is disposed within the HECS so that a compressor side of the turbocharger is disposed in the intake conduit upstream of the intake throttle valve and a turbine side of the turbocharger is disposed in the first path, wherein the turbine side of the turbocharger includes vanes that are adjustable to control the amount of exhaust gas that flows through the turbine side. A first pressure sensor is disposed in the first path upstream of the thermal management valve, a second pressure sensor is disposed in the second path upstream of the EGR valve, and a third pressure sensor is disposed in the engine intake conduit upstream of the intake throttle valve. A controller is in electrical communication with the EGR valve, the thermal management valve, the intake throttle valve, the first pressure sensor, the second pressure sensor, and the third pressure sensor, wherein the controller is configured to implement a predetermined set of operating parameters for the engine, the EGR valve, the thermal management valve, the vanes of the turbine side of the turbocharger, and/or the intake throttle valve, wherein implementation of the predetermined set of operating parameters causes an increased flow velocity of exhaust gas through the EGR cooler.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

Figure 1:
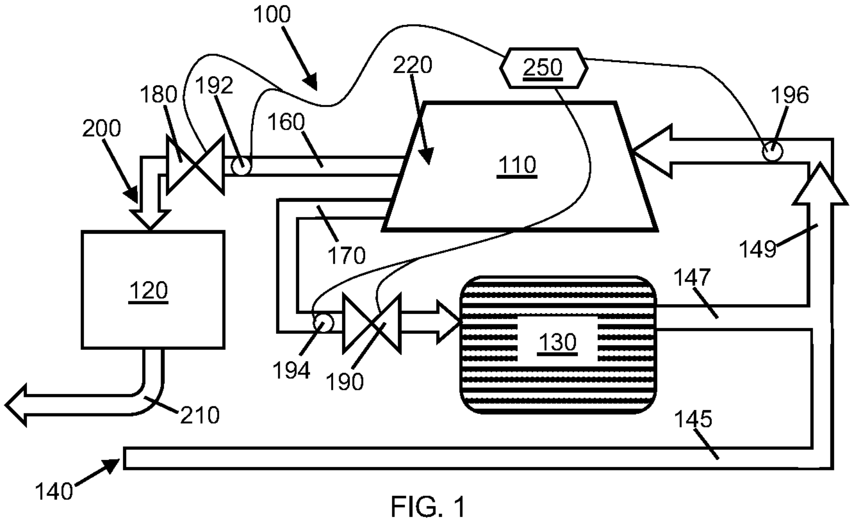
FIG. 1 is a schematic diagram of a heat exchanger cleaning system according to an embodiment of the invention.

In the following detailed description, various embodiments are described with reference to the appended drawings. The skilled person will understand that the accompanying drawings are schematic and simplified for clarity. Like reference numerals refer to like elements or components throughout. Like elements or components will therefore not necessarily be described in detail with respect to each figure.

DETAILED DESCRIPTION

Modern diesel engines typically include some sort of diesel particulate filter (DPF) that is designed to capture and eliminate particulates resulting from diesel combustion before the particulates are exhausted to the environment. A DPF typically requires periodic cleaning to clear out the particulates and keep the DPF operating within normal parameters. Regeneration is a known process by which the DPF is cleaned, whereby exhaust gas temperatures are raised to burn off the particulate matter to eliminate it from the DPF. An exemplary regeneration cycle includes an injection of atomized fuel into the engine (known as in-cylinder dosing) or into the exhaust stream (known as down-stream injection) to increase exhaust gas temperatures to burn off and eliminate particulates from within the DPF.

An exhaust gas recirculation (EGR) cooler disposed downstream of the exhaust side of the engine can be used to cool and divert a portion of the exhaust gas back into the engine to inhibit the production of $NO_x$ and $O_3$ emissions. However, because the EGR cooler is downstream of the engine exhaust, soot and hydrocarbons generated during a regeneration cycle can collect within the EGR cooler, which can become problematic in causing a lowered rate of heat transfer and/or restricting the flow paths through the EGR cooler. It should be noted that a particulate filter and/or EGR cooler can be useful for use with engines other than diesel engines, for example without limitation, engines powered by gasoline, propane, or any fuel that results in the generation of hydrocarbons and soot.

Referring to FIG. 1, an exemplary heat exchanger cleaning system (HECS) 100 is schematically illustrated including an engine 110, a DPF 120, and an EGR cooler 130 connected by several flow conduits and valves as will be further described. The exemplary heat exchanger illustrated is the EGR cooler 130; however, in other embodiments, for example without limitation, interstage coolers, radiators, or other heat exchangers can be cleaned by an increased velocity of fluid passed therethrough as is described herein for the EGR cooler 130. Throughout this application the expression "in fluid communication" refers to a connection or flow path between components that provides fluid communication between the components, the connection or flow path comprising a conduit, a manifold, or tubing as is known in the art and need not be described in further detail herein.

In the embodiment of the HECS 100 shown in FIG. 1, ambient air enters the HECS 100 via air inlet 140 and is directed through conduit 145 ultimately entering the engine 110 where it is mixed with fuel and combusted to produce power. In an embodiment post-combustion exhaust gas and unburnt fuel exits the engine 110 into conduits 160 and 170. In an embodiment an EGR valve 190 is disposed in the conduit 170. A portion of the exhaust gas and unburnt fuel is directed back through the EGR cooler 130 via the conduit 170 while the rest of the exhaust gas and unburnt fuel is directed into the DPF 120 via the conduit 160.

Figure 2:
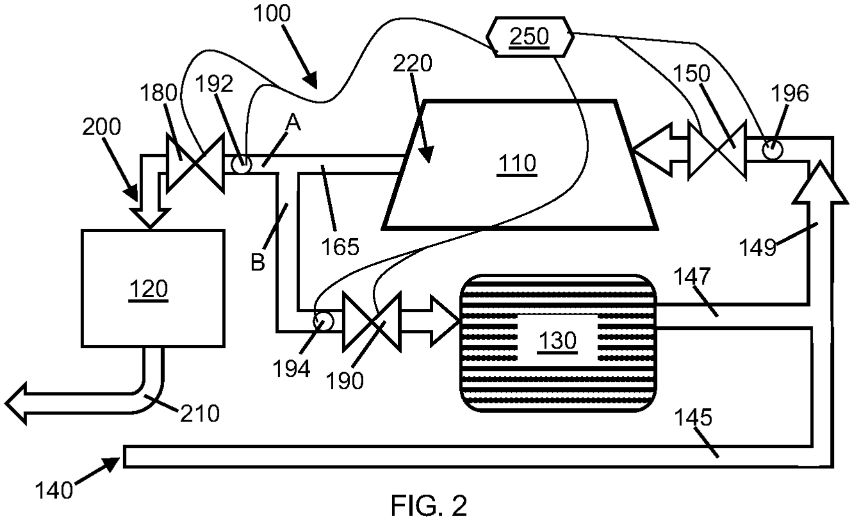
FIG. 2 is a schematic diagram of a heat exchanger cleaning system according to another embodiment of the invention.

In the embodiment of the HECS 100 shown in FIG. 2, ambient air enters the HECS 100 via air inlet 140 and is directed through conduit 145 ultimately passing through an intake throttle valve 150 and entering the engine 110 where it is mixed with fuel and combusted to produce power. In an embodiment post-combustion exhaust gas and unburnt fuel exits the engine 110 into a conduit 165. In an embodiment the conduit 165 splits into two paths—a first path, A, toward the DPF 120 and a second path, B, toward the EGR cooler 130. In an embodiment a thermal management valve 180 is disposed in the first path A and an EGR valve 190 is disposed in in the second path B. Depending on the opened/closed settings of the valves 180 and 190, a portion of the exhaust gas and unburnt fuel is directed back through the EGR cooler 130 while the rest of the exhaust gas and unburnt fuel is directed into the DPF 120. Hereinafter, "exhaust gas" is defined to mean the fluid that exits from the exhaust port of the engine 110 and comprises both the products of combustion within the engine 110 as well as any remaining unburnt fuel.

The EGR cooler 130 operates by transferring heat to the engine cooling system, which is not shown in the figures, but which is well known in the art. For example, in an embodiment exhaust gas passes through the EGR cooler 130 in thermal contact with engine coolant so that the EGR cooler 130 effectively functions as a heat exchanger by cooling the exhaust gas with the engine coolant. The engine cooling system cools the engine and the EGR cooler and sheds heat to the environment, for example, via a radiator and fan as is known in the art. Referring to FIGS. 1 and 2, exhaust gas exits the EGR cooler 130 into a conduit 147 that joins together with the conduit 145 to form engine intake conduit 149. In an embodiment an intake throttle valve 150 is disposed in the engine intake conduit 149. Although no valve is indicated in FIG. 1 or 2 positioned to prevent flow of the exhaust gas exiting the EGR cooler 130 toward the air inlet 140, operation of the engine and other factors result in a direction of flow toward the engine 110 as shown and prevent any such back flow.

Referring to FIGS. 1 and 2, several pressure sensors can be disposed within the HECS 100 to provide pressure data from which pressure drops and flow rates can be computed so that, for example, the existence or absence of problematic blockages can be deduced. For example, in an embodiment, a DPF inlet pressure sensor 192 is disposed in the conduit 160 or in the first path A just upstream of the thermal management valve 180. In an embodiment, an EGR inlet pressure sensor 194 is disposed in the conduit 170 or in the second path B just upstream of the EGR valve 190, and in an embodiment an intake throttle pressure sensor 196 is disposed in the engine intake conduit 149 just upstream of the engine 110 or just upstream of the intake throttle valve 150.

In addition to the valves 150, 180, 190 and the pressure sensors 192, 194, 196 as described hereinabove, in an embodiment the HECS 100 further includes a controller 250. In an embodiment the controller 250 is a standalone controller including one or more microprocessors, and for example, having dedicated memory and non-volatile storage for cleaning and/or calibration control programs and stored data logs. In another embodiment the controller 250 is part of a larger vehicle controller and may also include one or more microprocessors, for example, having dedicated memory and non-volatile storage for cleaning and/or calibration control programs and stored data logs. In an embodiment the controller 250 is in electrical communication with and can receive data from and/or send actuation signals and/or power to all of the valves 150, 180 190 and pressure sensors 192, 194, 196 via hardwired connections as schematically indicated by the lines connecting the controller 250 to the valves 150, 180 190 and the sensors 192, 194, 196. In addition to or instead of the hardwired connections shown in FIGS. 1 and 2, in an embodiment the controller 250 communicates wirelessly with all of the valves 150, 180 190 and the sensors 192, 194, 196. The controller 250 is also in electrical communication with other components via a wired and/or wireless connection, for example without limitation, fuel injectors, and a turbocharger (which is described further hereinbelow).

Still referring to FIGS. 1 and 2, and as further described hereinbelow, in an embodiment a portion of the exhaust gas from the engine 110 is diverted through the EGR cooler 130 back into the engine 110 for the purpose of reducing $NO_x$ and $O_3$ emissions. The engine 110 can be calibrated to at least inhibit excessive hydrocarbons and soot from entering the EGR cooler 140 under normal operating conditions. However, the buildup of hydrocarbons and soot within the EGR cooler 140 is particularly prevalent when the engine 110 is not operating under normal conditions but is rather in a regeneration mode, during which time the normal engine calibration is not an option.

Still referring to FIGS. 1 and 2, in a first exemplary regeneration mode process commonly referred to as downstream injection, atomized fuel is injected into the exhaust stream for example as shown at 200 in both FIGS. 1 and 2 downstream of the thermal management valve 180. The atomized injected fuel comes into contact with the very hot surfaces of the DPF 120 and ignites, thereby burning off particulates that may be built up on the surfaces. The burned-up particulates exit the DPF via the exit conduit 210. In a second exemplary regeneration mode process commonly known as in-cylinder dosing, atomized fuel is injected into the engine cylinders for example as shown symbolically by the arrow 220. Again, the atomized injected fuel ignites and flows to the DPF 120 to burn off particulates that may be built up on internal surfaces of the DPF 120. However, in the in-cylinder dosing process a portion of the exhaust gas also flows into the EGR cooler 130 via the conduit 170 or path B.

In an exemplary EGR cooler cleaning process gas flow velocity through the EGR cooler 130 is increased to velocities sufficiently high that the gas flow shears any built up layers of hydrocarbons and soot off of internal EGR cooler 130 flow path surfaces. In an embodiment the increase in gas flow velocity is controlled through a cleaning process wherein the engine 110 and one or more of the valves 150, 180, 190 are commanded by the controller 250 to operate at predetermined set-points. In an embodiment such a cleaning process is incorporated into the engine 110 control software and calibration which is stored on the controller 250, or stored elsewhere and accessed by the controller 250, where the cleaning process can be triggered manually by a user via a user interface or switch, or triggered automatically by the controller 250 at predetermined points in time and/or based upon a sensed status of the EGR cooler 130, for example, as determined by sensed pressures at one or more of the pressure sensors 192, 194, 196 indicative of a flow restriction through the EGR cooler 130.

Figure 3:
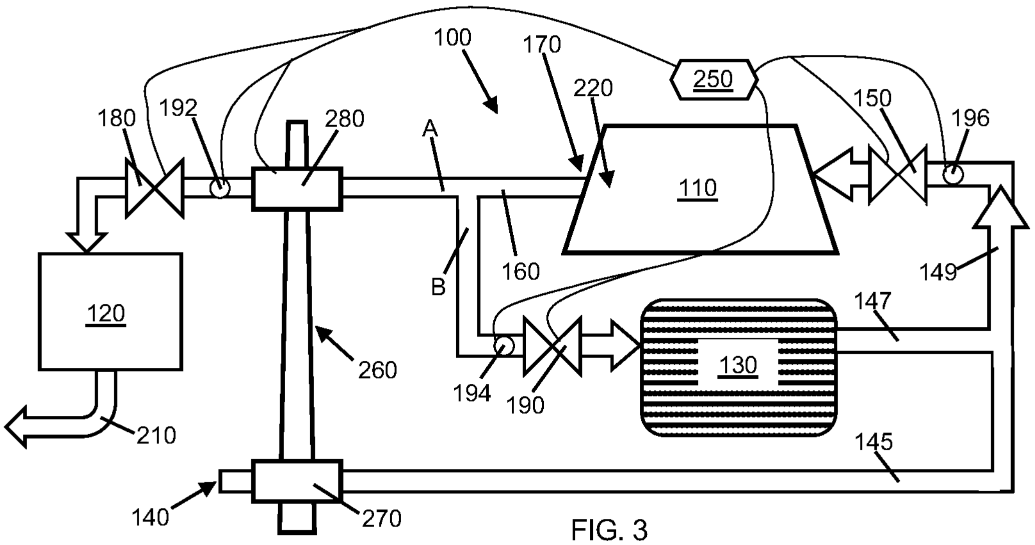
FIG. 3 is a schematic diagram of a heat exchanger cleaning system according to a further embodiment of the invention.
Figure 4:
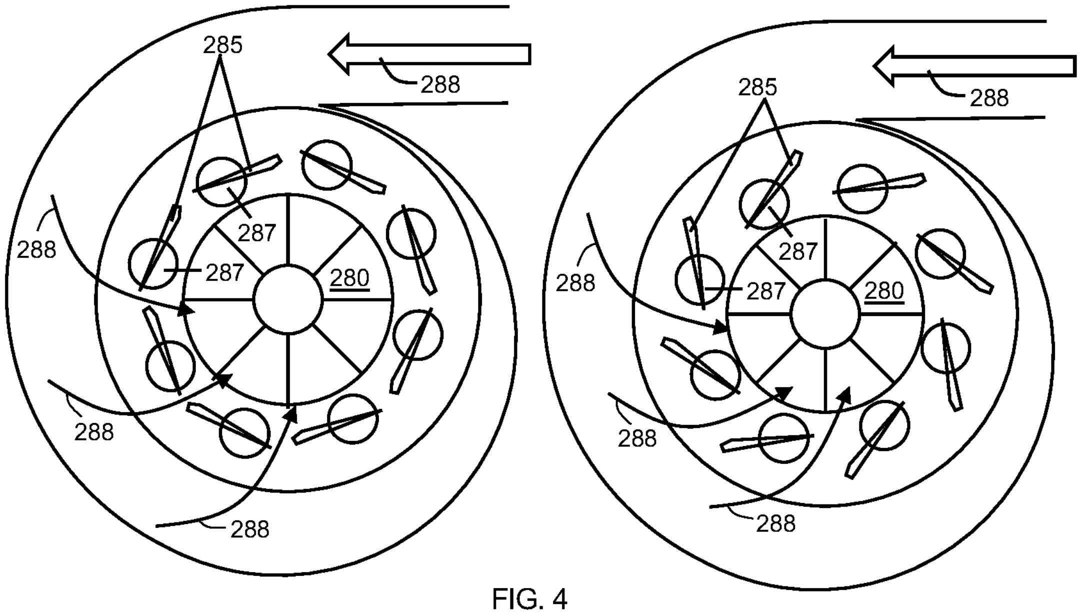
FIG. 4 is schematic diagram of adjustable vanes on a turbine where the vanes are in a first rotational orientation on the left and a second rotational orientation on the right.

Referring now to FIGS. 3 and 4, an embodiment of the HECS 100 includes a variable geometry turbocharger 260 including turbine blades or an inlet housing having vanes 285 that can be rotated around pivot points 287 to control the amount and velocity of gas that flows through the turbine 280. In an embodiment, the ambient air enters HECS 100 via air inlet 140 and passes through a compressor 270 of the variable geometry turbocharger 260. Exhaust gas from the engine 110 is passed through a turbine side 280 of the variable geometry turbocharger 260 via path A. Expanding the exhaust gas through the turbine side 280 of the variable geometry turbocharger 260 causes the compressor side 270 to spin and thereby draw in and compress ambient air as is known in the art. The rest of the embodiment of the HECS 100 having the variable geometry turbocharger 260 is the same as the embodiment of the HECS 100 lacking the variable geometry turbocharger 260 shown in FIG. 2. In an embodiment the turbocharger 260 is in wired and/or wireless electrical communication with the controller 250 as schematically indicated by the line connecting the turbine 280 to the controller 250 in FIG. 3.

Referring to FIG. 4, in an embodiment with exhaust gas flowing in the direction of the arrows 288, the vanes 285 can be commanded by the controller 250 to rotate around pivot points 287 to allow more or less flow through the turbine 280. For example, a turbine 280 is shown on the left in FIG. 4 with the vanes 285 in a first rotated position allowing relatively less flow through the turbine 280 and on the right with the vanes 285 in a second rotated position allowing relatively more flow through the turbine 280. Controlling the rotational position of the vanes 280 allows the turbine to act as an actuator or valve for the purposes of the invention. In an embodiment, increasing back pressure on the exhaust of the HECS 100, for example along path A, by restricting flow through the thermal management valve 180 and/or by rotating the vanes 285 to restrict flow through the turbine 280, results in an increased flow through the EGR cooler 130.

Figure 5:
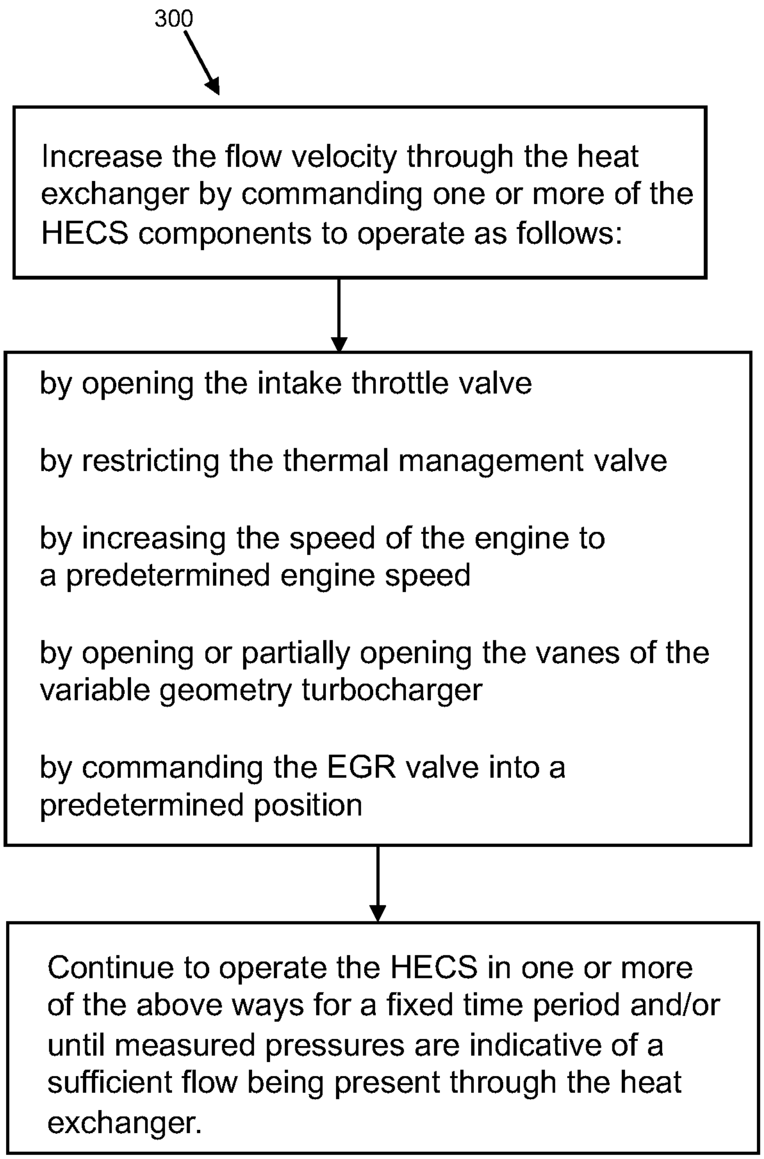
FIG. 5 is a block diagram of the steps in an exemplary method of operation of a heat exchanger cleaning system according to an embodiment of the invention.

Referring to FIG. 5, in an embodiment, the process 300 described hereinbelow further includes the steps of the controller 250 commanding the vanes 285 of the turbocharger 260 to change rotational orientation. In an embodiment, increasing the engine speed to a predetermined speed and/or opening the throttle intake valve results in an increased flow through the EGR cooler 130. In an embodiment, partially or fully opening the EGR valve 190 results in an increased flow through the EGR cooler 130. It is noted that opening the EGR valve 190 more generally results in a higher velocity of exhaust gas flowing through the EGR cooler 130; however, in practice the increase in exhaust gas velocity is not linear with the more opened valve position, and in some embodiments there is a diminishing increase in exhaust gas velocity when the EGR valve 190 is opened past a certain setpoint.

As noted hereinabove, the apparatus and method as described herein are not exclusive to any particular type of engine and can be applied to an engine used to power a vehicle or indeed to any sort of mobile or fixed installation utilizing the engine, for example without limitation, a generator, a locomotive, a tractor, or even a spaceship.

In an exemplary heat exchanger cleaning process 300 gas flow velocity through the heat exchanger, for example, the EGR cooler 130, is increased to velocities sufficiently high that the gas flow shears any built up layers of hydrocarbons and soot off of internal EGR cooler 130 flow path surfaces. In an embodiment the increase in gas flow velocity is controlled through a cleaning process 300 wherein the engine 110 and/or one or more of the valves 150, 180, 190 are commanded by the controller 250 to operate at specific predetermined set-points. In an embodiment such a cleaning process 300 is incorporated into the engine 110 control software and calibration which is stored on the controller 250, or stored elsewhere and accessed by the controller 250, where the cleaning process 300 can be triggered manually by a user via a user interface or switch, or triggered automatically by the controller 250 at predetermined points in time and/or based upon a sensed status of the EGR cooler 130, for example, as determined by sensed pressures at one or more of the pressure sensors 192, 194, 196 indicative of a flow restriction through the EGR cooler 130.

Referring to FIG. 5, in an embodiment, a cleaning process 300 for a heat exchanger increases the gas flow rates and/or flow velocities through the heat exchanger, for example, the EGR cooler 130, by implementing a predetermined set of operating parameters for the engine and/or the above described components of the HECS 100, wherein implementation of the predetermined set of operating parameters causes an increased flow velocity of exhaust gas through the EGR cooler 130. For example, in an embodiment, the process 300 includes the controller 250 causing the engine 110 and the components described herein to operate in one or more of the following ways to achieve an increased flow of gas through the EGR cooler 130: 1) by opening the intake throttle valve 150; 2) by closing or restricting the thermal management valve 180; 3) by increasing the speed of the engine 110 to a predetermined engine speed; 4) by changing the rotational orientation of the vanes 285 to restrict flow through the variable geometry turbocharger 260; and/or 5) by commanding the EGR valve 190 into a predetermined position. In an embodiment the method 300 continues to operate for a fixed time period and/or until pressures as determined by sensed pressures at one or more of the pressure sensors 192, 194, 196 are indicative of a sufficient flow being present through the EGR cooler 130.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity. Unless otherwise noted, the use of the words "approximate," "about," "around," "substantially," etc., mean plus or minus ten percent.

INDUSTRIAL APPLICABILITY

A heat exchanger cleaning system and method is presented that cleans out the flow paths of a heat exchanger by creating an increased flow velocity of exhaust gas passing through the heat exchanger, wherein the increased gas velocity effectively shears off hydrocarbons and soot from the flow path surfaces of the heat exchanger. The system can be manufactured in industry for consumers and the method can be executed by consumers.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

We claim:

1. A heat exchanger cleaning system (HECS), comprising:

an engine;

an engine intake conduit, and an engine exhaust port;

an exhaust gas recirculation (EGR) cooler having a cooler inlet in fluid communication with the engine exhaust port, a cooler outlet in fluid communication with the engine intake conduit, and an EGR valve disposed in fluid communication with and between the engine exhaust port and the EGR cooler;

a first pressure sensor disposed in fluid communication with and between the engine exhaust port and the EGR valve;

a second pressure sensor disposed in the engine intake conduit; and a controller in electrical communication with the EGR valve, the first pressure sensor, and the second pressure sensor;

wherein the controller is configured to implement a predetermined set of operating parameters for the engine and/or the EGR valve, wherein implementation of the predetermined set of operating parameters causes an increased flow velocity of exhaust gas through the EGR cooler.

2. The HECS of claim 1, wherein during implementation of the predetermined set of operating parameters the EGR valve is held in a partially open condition.

3. The HECS of claim 1, wherein during implementation of the predetermined set of operating parameters the EGR valve is held in a fully open position.

4. A method for operating the HECS of claim 1, the method comprising steps selected from a group of steps consisting of increasing the speed of the engine to a predetermined engine speed, commanding the EGR valve to a predetermined position, and combinations thereof.

5. The method of claim 4, wherein the method continues to operate for a fixed time period and/or until pressures as determined by sensed pressures at one or both of the first and second pressure sensors is indicative of a sufficient flow being present through the EGR cooler.

6. The HECS of claim 1, further comprising an intake throttle valve disposed between the second pressure sensor and the engine and in electrical communication with the controller, wherein the controller is further configured to implement the predetermined set of operating parameters for the engine, the EGR valve, and/or the intake throttle valve, wherein implementation of the predetermined set of operating parameters causes an increased flow velocity of exhaust gas through the EGR cooler.

7. A method for operating the HECS of claim 6, the method comprising steps selected from a group of steps consisting of increasing the speed of the engine to a predetermined engine speed, commanding the EGR valve to a predetermined position, opening the intake throttle valve, and combinations thereof.

8. The method of claim 7, wherein the method continues to operate for a fixed time period and/or until pressures as determined by sensed pressures at one or both of the first and second pressure sensors is indicative of a sufficient flow being present through the EGR cooler.

9. A heat exchanger cleaning system (HECS), comprising:

an engine;

an engine intake conduit having an intake throttle valve disposed therein, and an engine exhaust port;

an exhaust manifold having a single inlet conduit and two outlet paths, wherein the single inlet conduit connects to the engine exhaust port, wherein a first path of the two outlet paths includes a thermal management valve disposed therein, and wherein a second path of the two outlet paths includes an exhaust gas recirculation (EGR) valve disposed therein;

an EGR cooler having a cooler inlet in fluid communication with the EGR valve and a cooler outlet in fluid communication with the intake throttle valve;

a first pressure sensor disposed in the first path upstream of the thermal management valve;

a second pressure sensor disposed in the second path upstream of the EGR valve;

a third pressure sensor disposed in the engine intake conduit upstream of the intake throttle valve; and a controller in electrical communication with the EGR valve, the thermal management valve, the intake throttle valve, the first pressure sensor, the second pressure sensor, and the third pressure sensor;

wherein the controller is configured to implement a predetermined set of operating parameters for the engine, the EGR valve, the thermal management valve, and/or the intake throttle valve, wherein implementation of the predetermined set of operating parameters causes an increased flow velocity of exhaust gas through the EGR cooler.

10. The HECS of claim 9, wherein during implementation of the predetermined set of operating parameters the EGR valve is held in a predetermined partially or fully open position.

11. A method for operating the HECS of claim 9, the method comprising steps selected from a group of steps consisting of increasing the speed of the engine to a predetermined engine speed, commanding the EGR valve to a predetermined position, opening the intake throttle valve, restricting the thermal management valve, and combinations thereof.

12. The method of claim 11, wherein the method continues to operate for a fixed time period and/or until pressures as determined by sensed pressures at one or more of the first, second, and third pressure sensors is indicative of a sufficient flow being present through the EGR cooler.

13. A heat exchanger cleaning system (HECS), comprising:

an engine;

an engine intake conduit having an intake throttle valve disposed therein, and an engine exhaust port;

an exhaust manifold having single inlet conduit and two outlet paths, wherein the single inlet conduit connects to the engine exhaust port, wherein a first path of the two outlet paths includes a thermal management valve disposed therein, and wherein a second path of the two outlet paths includes an exhaust gas recirculation (EGR) valve disposed therein;

an EGR cooler having a cooler inlet in fluid communication with the EGR valve and a cooler outlet in fluid communication with the intake throttle valve;

a variable geometry turbocharger disposed within the HECS so that a compressor side of the turbocharger is disposed in the intake conduit upstream of the intake throttle valve and a turbine side of the turbocharger is disposed in the first path, wherein the turbine side of the turbocharger includes vanes that are adjustable to control the amount of exhaust gas that flows through the turbine side;

a first pressure sensor disposed in the first path upstream of the thermal management valve;

a second pressure sensor disposed in the second path upstream of the EGR valve;

a third pressure sensor disposed in the engine intake conduit upstream of the intake throttle valve; and a controller in electrical communication with the EGR valve, the thermal management valve, the intake throttle valve, the turbine side of the turbocharger, the first pressure sensor, the second pressure sensor, and the third pressure sensor;

wherein the controller is configured to implement a predetermined set of operating parameters for the engine, the EGR valve, the thermal management valve, the vanes of the turbine side of the turbocharger, and/or the intake throttle valve, wherein implementation of the predetermined set of operating parameters causes an increased flow velocity of exhaust gas through the EGR cooler.

14. The HECS of claim 13, wherein during implementation of the predetermined set of operating parameters the EGR valve is held in a predetermined partially or fully open position.

15. A method for operating the HECS of claim 13, the method comprising steps selected from a group of steps consisting of increasing the speed of the engine to a predetermined engine speed, commanding the EGR valve to a predetermined position, opening the intake throttle valve, restricting the thermal management valve, change rotational orientation of the vanes to restrict flow through the variable geometry turbocharger, and combinations thereof.

16. The method of claim 15, wherein the method continues to operate for a fixed time period and/or until pressures as determined by sensed pressures at one or more of the first, second, and third pressure sensors is indicative of a sufficient flow being present through the EGR cooler.

* * * * *